United States Patent
Basic et al.

(10) Patent No.: US 8,519,650 B2
(45) Date of Patent: Aug. 27, 2013

(54) METHOD FOR DETERMINING THE INDUCTANCES OF A PERMANENT MAGNET SYNCHRONOUS MACHINE

(75) Inventors: Duro Basic, Wollongong (AU); Stefan Capitaneanu, Mousseaux Neuville (FR); Francois Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 290 days.

(21) Appl. No.: 13/000,472

(22) PCT Filed: Jun. 23, 2009

(86) PCT No.: PCT/EP2009/057777
§ 371 (c)(1),
(2), (4) Date: Dec. 21, 2010

(87) PCT Pub. No.: WO2010/000640
PCT Pub. Date: Jan. 7, 2010

(65) Prior Publication Data
US 2011/0101900 A1    May 5, 2011

(30) Foreign Application Priority Data
Jul. 1, 2008   (FR) ...................................... 08 54427

(51) Int. Cl.
*H02P 1/04*    (2006.01)
(52) U.S. Cl.
USPC ................. 318/400.09; 318/400.02; 318/599; 318/700; 318/400.01; 318/797; 318/254.1
(58) Field of Classification Search
USPC ..................... 318/254.1, 400.09, 400.01, 700, 318/599, 811, 808, 807, 810, 812, 802, 797, 798, 400.02; 324/207.11, 207.25
See application file for complete search history.

(56) References Cited

U.S. PATENT DOCUMENTS 4,763,058 A * 8/1988 Heining et al. ................ 318/807
5,097,190 A * 3/1992 Lyons et al. .................. 318/701
(Continued)

FOREIGN PATENT DOCUMENTS
WO       2004 023639        3/2004

OTHER PUBLICATIONS

Matsui, N., "Sensorless PM Brushless DC Motor Drives," IEEE Transactions on Industrial Electronics, vol. 43, No. 2, pp. 300-308, (Apr. 1996), XP 011023173.

(Continued)

*Primary Examiner* — Rita Leykin
(74) *Attorney, Agent, or Firm* — Oblon, Spivak, McClelland, Maier & Neustadt, L.L.P.

(57) ABSTRACT

The invention relates to a control method implemented in a variable speed drive for determining the inductances (Ld, Lq) of a permanent magnet synchronous machine comprising three phases (a, b, c), each oriented along a direction, a stator, and a rotor. For each phase, one after the other, said method includes steps of: applying, along the direction of the phase (a, b, c), a voltage vector (V1, V3, V5) in the positive direction and a voltage vector (V2, V4, V6) in the negative direction for a predetermined duration; measuring the current obtained in the phase after applying the voltage vectors in both directions; determining an angle ($\theta_r$) for the position of the rotor in relation to the stator based on the measured current; and determining the flow (Ld) and torque (Lq) inductances of the machine based on the predetermined angle ($\theta_r$).

8 Claims, 3 Drawing Sheets

(56) References Cited

U.S. PATENT DOCUMENTS

Figure 1:
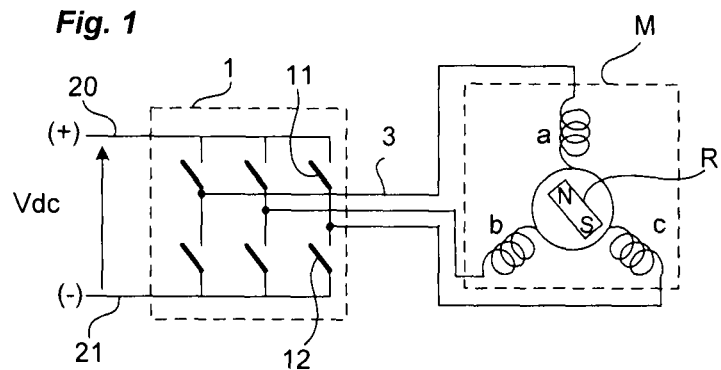

| | | | |
|---|---|---|---|
| 5,107,195 A * | 4/1992 | Lyons et al. | 318/701 |
| 5,614,803 A * | 3/1997 | Morioka et al. | 318/801 |
| 5,864,218 A * | 1/1999 | Orthmann | 318/701 |
| 5,973,431 A * | 10/1999 | Li et al. | 310/168 |
| 6,069,808 A * | 5/2000 | Panahi et al. | 363/98 |
| 6,172,498 B1 * | 1/2001 | Schmidt et al. | 324/207.12 |
| 6,498,452 B1 * | 12/2002 | Luukko | 318/700 |
| 6,690,137 B2 * | 2/2004 | Iwaji et al. | 318/700 |
| 7,067,997 B2 * | 6/2006 | Neuvonen | 318/400.02 |
| 7,071,651 B2 * | 7/2006 | Toyozawa et al. | 318/807 |
| 7,095,206 B2 * | 8/2006 | Lequesne et al. | 318/254.1 |
| 7,161,324 B1 * | 1/2007 | Satake et al. | 318/720 |
| 7,746,039 B2 * | 6/2010 | Hoffmann et al. | 322/89 |
| 8,278,855 B2 * | 10/2012 | Kitanaka | 318/400.22 |
| 2005/0269982 A1 | 12/2005 | Coles et al. | |
| 2006/0284582 A1 | 12/2006 | Jeong et al. | |
| 2007/0070560 A1 | 3/2007 | Hikawa et al. | |

OTHER PUBLICATIONS

Parasiliti, F., et al., "Initial Rotor Position Estimation Method for PM Motors," Industry Applications Conference, IEEE, vol. 2, pp. 1190-1196, (2000), XP 010521468.

International Search Report issued Aug. 11, 2009 in PCT/EP09/057777 filed Jun. 23, 2009.

* cited by examiner

METHOD FOR DETERMINING THE INDUCTANCES OF A PERMANENT MAGNET SYNCHRONOUS MACHINE

The present invention relates to a method for determining inductances of a permanent magnet synchronous machine, also called PMSM. The invention also relates to a variable speed drive that is able to implement said method.

As is known, a variable speed drive comprises a rectifier module which supplies a DC voltage from an external AC power supply network and an inverter module (or chopper). This inverter module comprises power semiconductor electronic components for chopping the DC voltage in pulse width modulation (PWM) mode, so as to supply at the output, via a power cable, a pulsed variable electrical voltage and a variable rotation frequency to the machine. A control device for the variable speed drive controls the conduction and the blocking of the semiconductor components at the sampling frequency, to control the machine in PWM mode with an appropriate variable voltage.

Permanent magnet synchronous machines are increasingly being used in variable speed drive systems because of their ease of construction and their high efficiency. These machines can be classified in two broad categories: machines provided with a smooth or cylindrical rotor and machines with a projecting rotor. For these two types of machine, it is important to know the flux inductance on the axis d and the torque inductance on the axis q in order to obtain a control loop and a reference model that are reliable and consistent.

The U.S. Pat. No. 6,498,452 and U.S. Pat. No. 7,067,997 disclose methods for determining the initial position of the rotor of a synchronous machine. These methods rely notably on the measurement of the inductances in the directions of the phases.

Note should also be made of the works by Pr. M. Shroedl (e.g. "Sensorless Control of AC Machines at Low Speed and Standstill Based on the "INFORM" Method", 31st Conference Record of IEEE Industry Applications Conference, IAS 1996, vol. 1, pp. 270 to 277, 6-10 Oct. 1996).

The aim of the invention is to propose a method that makes it possible to determine the flux and torque inductances of a permanent magnet synchronous machine.

This aim is achieved by a control method implemented in a variable speed drive for determining the flux and torque inductances (Ld, Lq) of a permanent magnet synchronous machine comprising three phases (a, b, c), each oriented in a direction, a stator and a rotor, characterized in that said method includes steps of:
- applying, in the direction of each phase of a voltage vector in the positive direction and of a voltage vector in the negative direction for a predetermined duration,
- measuring a current response in each phase after applying the voltage vectors in the two directions, the current response comprising, for each phase, a positive peak and a negative peak,
- determining an angle for the position of the rotor in relation to the stator based on the asymmetries between the positive peaks and the negative peaks of the current responses measured in all the phases,
- determining the flux and torque inductances of the machine as a function of the determined angle.

The inventive method is applicable regardless of the type of rotor employed (smooth or projecting) and regardless of the type of projection (Ld>Lq or Ld=Lq or Ld<Lq).

According to one particular feature, for each phase, the voltage vector applied in the positive direction and the voltage vector applied in the negative direction have one and the same norm.

According to another particular feature, for a phase, the application of the voltage vector in the positive direction and of the voltage vector in the negative direction entails applying a voltage sequence comprising a positive voltage pulse of a predetermined pulse width, followed by a negative voltage pulse having two times the predetermined pulse width, followed by a positive voltage pulse of the predetermined pulse width.

According to another particular feature, the current response in the phase comprises a positive current peak and a negative current peak and the method consists in recovering, for each phase and at the same instants, two distinct current values on the positive current peak, in its upward phase and two distinct current values on the negative current peak, in its downward phase.

More specifically, the method consists in determining the following values:

$$\Delta Ia_{ave} = \frac{|\delta I_{a+}| + |\delta I_{a-}|}{2}$$

$$\Delta Ia_{diff} = \frac{|\delta I_{a+}| - |\delta I_{a-}|}{2}$$

$$\Delta Ib_{ave} = \frac{|\delta I_{b+}| + |\delta I_{b-}|}{2}$$

$$\Delta Ib_{diff} = \frac{|\delta I_{b+}| - |\delta I_{b-}|}{2}$$

$$\Delta Ic_{ave} = \frac{|\delta I_{c+}| + |\delta I_{c-}|}{2}$$

$$\Delta Ic_{diff} = \frac{|\delta I_{c+}| - |\delta I_{c-}|}{2}.$$

The angle is then determined on the basis of the following relations:

$$\Delta I_{diff} = \Delta Ia_{diff} + \Delta Ib_{diff} e^{j2\pi/3} + \Delta Ic_{diff} e^{j4\pi/3} \ et \ \theta_r = \arctan(\Delta I_{diff})$$

The flux and torque inductances of the machine are determined on the basis of the following relations:

$$\Delta I_{ave} = \frac{1}{3}(\Delta Ia_{ave} + \Delta Ib_{ave} + \Delta Ic_{ave})$$

$$\Delta I_{var} = \frac{2}{3}(\Delta Ia_{ave}\cos(2\theta r) + \Delta Ib_{ave}\cos(2\theta r + 2\pi/3) + \Delta Ic_{ave}\cos(2\theta r + 4\pi/3)$$

$$\Delta I_d = \Delta I_{ave} + \Delta I_{var}$$

$$\Delta I_q = \Delta I_{ave} - \Delta I_{var}$$

$$L_d = \frac{2/3 V_{dc} \Delta t}{\Delta I_d}$$

$$L_q = \frac{2/3 V_{dc} \Delta t}{\Delta I_q}$$

The invention also relates to a variable speed drive comprising a PWM-type inverter for supplying a pulsed voltage to a permanent magnet three-phase synchronous machine, said variable speed drive implementing the method as described hereinabove.

Figure 2A:
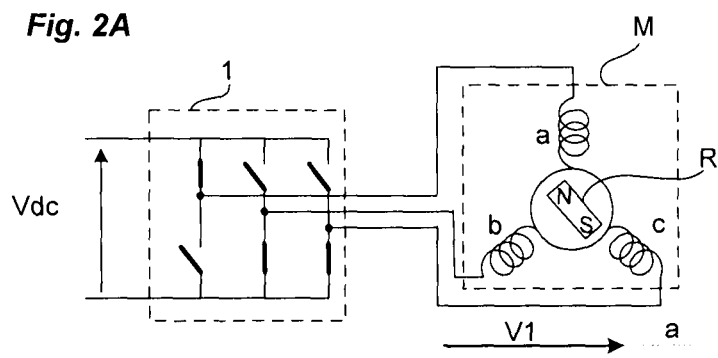
Figure 2B:
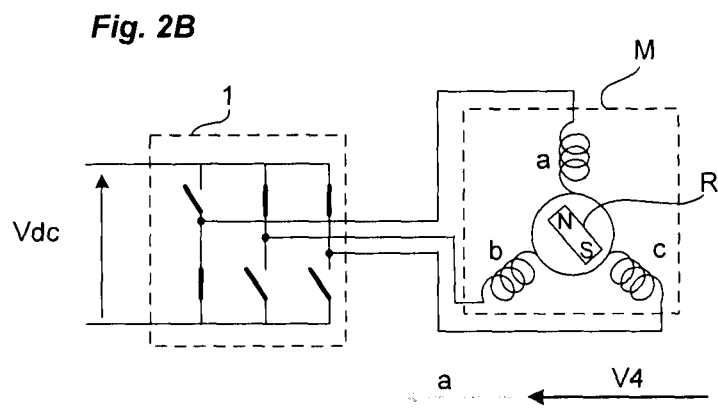
Figure 3:
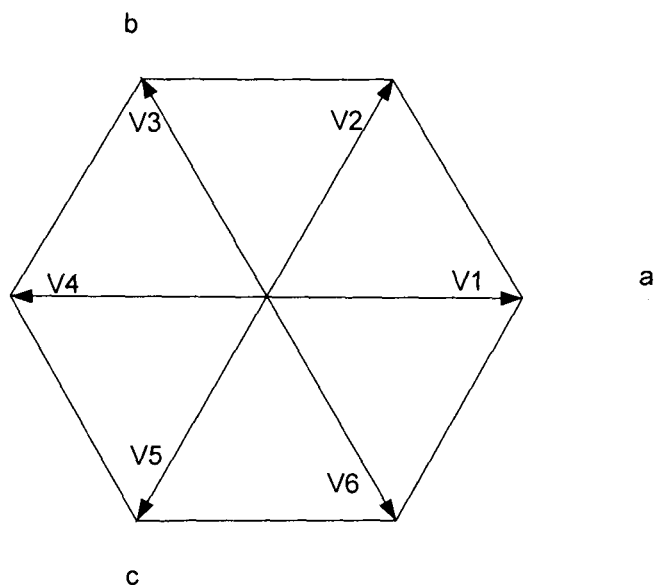
Figure 4:
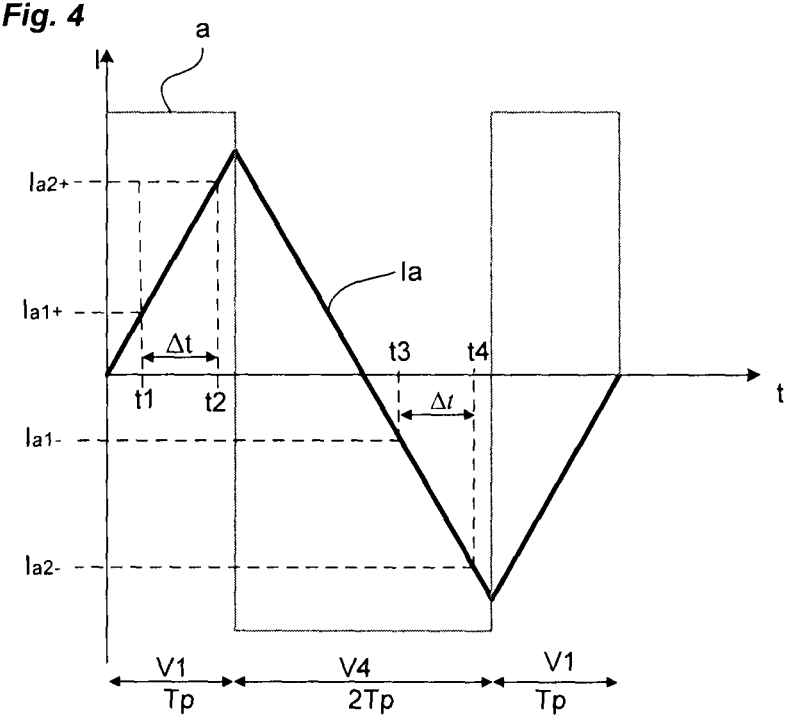
Figure 5:
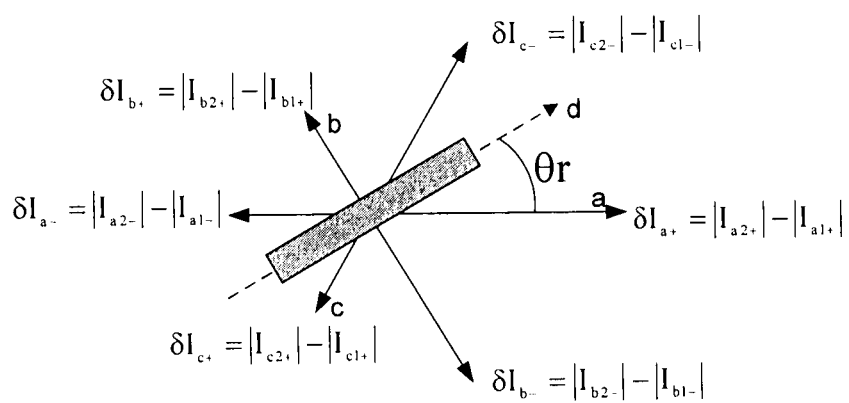

Other features and advantages will be become apparent from the following detailed description with reference to an embodiment given by way of example and represented by the appended drawings in which:

FIG. 1 is a simplified representation of a PWM-type inverter supplying a three-phase permanent magnet synchronous electrical machine, FIGS. 2A and 2B respectively represent the open/closed combinations of the switches of the inverter module for obtaining, respectively, a voltage vector V1 on the phase a and a voltage vector V4 on this same phase a, FIG. 3 is a vector representation of the voltages applied in the directions of each phase of the machine, FIG. 4 represents the voltage sequence applied for the phase a and the current response obtained in the phase a, FIG. 5 is a vector representation of the current responses obtained for each phase after application to each phase of the voltage vectors represented in FIG. 3.

Referring to the simplified circuit diagram of FIG. 1, a variable speed drive intended to control a three-phase permanent magnet synchronous machine M comprises a rectifier module (not represented) generally consisting of a diode bridge, supplying a DC voltage to a DC power supply bus. The DC bus comprises a positive line 20 and a negative line 21, a bus capacitor (not represented) being connected between the positive line 20 and the negative line 21 of the DC bus. The DC bus powers an inverter module 1 linked to the machine M by a power cable 3 powering the three phases a, b, c of the machine oriented in three directions mutually offset by 120°. For each phase a, b, c of the machine M, the inverter module 1 comprises two power semiconductor electronic switches 11, 12, of IGBT or other type (represented in FIG. 1 as simple switches to simplify the drawing), making it possible to generate a variable voltage to the machine from the DC voltage Vdc of the bus. The variable speed drive also comprises control, processing and storage means for implementing its various functionalities.

The inventive method is applicable for permanent magnet synchronous machines provided with a smooth rotor or a projecting rotor.

The principle of the invention is to apply, for each phase, one after the other, in each direction of the phases, a voltage vector in the positive direction and a voltage vector in the negative direction. Two voltage vectors are therefore applied for each phase a, b, c. The term "voltage vector" should be understood to mean a vector whose resultant is derived from the various voltages applied to the three phases. FIGS. 2A and 2B show a combination of actuation of the switches of each phase making it possible to obtain, respectively, a positive voltage vector V1 in the direction of the phase a and a negative voltage vector V4 in this same direction. For each phase, the positive voltage vector and the negative voltage vector applied are preferably of the same norm in order not to create a movement of the rotor. The norm of each voltage vector Vi applied is dependent on the voltage Vdc of the DC bus and has a value that is, for example, ⅔ of the voltage Vdc.

$$Vi = \tfrac{2}{3} Vdc$$

Referring to FIG. 3, the voltage vectors V1, V2, V3, V4, V5 and V6 are therefore applied in the directions of the phases a, b, c in the positive and negative directions.

For a phase (the phase a), the voltage sequence that makes it possible to obtain a positive voltage vector and a negative voltage vector in the direction of the phase is shown in FIG. 4. This voltage sequence consists in applying, by virtue of the inverter module 1, a voltage between the phase being studied and the other two phases and comprises a first positive voltage pulse of a predetermined pulse width Tp, followed by a negative voltage pulse having twice the predetermined pulse width Tp, followed by a positive voltage pulse of the predetermined pulse width Tp. This voltage sequence is optimized so as not to create torque on the machine and therefore not to result in movements of the rotor.

The pulse width Tp employed can be determined by scanning various pulse widths until a current peak is obtained that has a value that is sufficiently high to result in a detectable saturation effect.

According to the invention, the current response obtained on the phase being studied is analyzed so as to extract several values therefrom. As represented in FIG. 4, for a voltage sequence as defined hereinabove, the current response obtained exhibits, in succession, a positive peak and a negative peak.

Analyzing the current response entails recovering, for each phase, four current values using a specific sampling circuit. With reference to FIG. 4, two current values are recovered in the upward phase of the positive current peak and two current values are recovered in the downward phase of the negative current peak. The values are recovered at the same instants for all the phases, the time interval Δt between two measurements in the negative direction or in the positive direction always being identical. For the first positive voltage pulse, the first value Ia1+ is, for example, recovered at a third of the pulse width (at t1 in FIG. 4), whereas the second value Ia2+ is recovered toward the end of the voltage pulse (at t2 in FIG. 4).

As represented in FIG. 5, for the phase a, there are therefore recovered, for the positive peak, at t1, the value Ia1+ and, at t2, the value Ia2+, and, for the negative peak, at t3, the value Ia1− and, at t4, the value Ia2−. The same measurements are performed at the same instants for each of the current responses of the other phases. Thus, there are obtained, for the phase b, the values Ib2+, Ib1+, Ib2−, Ib1− and, for the phase c, the values Ic2+, Ic1+, Ic2−, Ic1−.

Then, based on these current values, the aim is to determine, for each phase, the current variations in the negative and positive directions. There are then obtained:

$$\delta I_{a+} = |I_{a2+}| - |I_{a1+}|$$

$$\delta I_{a-} = |I_{a2-}| - |I_{a1-}|$$

$$\delta I_{b+} = |I_{b2+}| - |I_{b1+}|$$

$$\delta I_{b-} = |I_{b2-}| - |I_{b1-}|$$

$$\delta I_{c+} = |I_{c2+}| - |I_{c1+}|$$

$$\delta I_{c-} = |I_{c2-}| - |I_{c1-}|$$

The corresponding vectors are represented in FIG. 5.

Although the voltages applied to each phase in the positive direction and in the negative direction are identical, the current values obtained for one and the same phase are not symmetrical because of the magnetic saturation effect of the motor. In practice, the current responses to voltage pulses applied to each phase depend on the position of the rotor. In order to take into account the magnetic saturation effect, the average of the variations in the positive and negative directions and the difference between the variations in the positive and negative directions are therefore calculated for each phase, in other words:

$$\Delta Ia_{ave} = \frac{|\delta I_{a+}| + |\delta I_{a-}|}{2}$$

$$\Delta Ia_{diff} = \frac{|\delta I_{a+}| - |\delta I_{a-}|}{2}$$

-continued $$\Delta Ib_{ave} = \frac{|\delta I_{b+}| + |\delta I_{b-}|}{2}$$

$$\Delta Ib_{diff} = \frac{|\delta I_{b+}| - |\delta I_{b-}|}{2}$$

$$\Delta Ic_{ave} = \frac{|\delta I_{c+}| + |\delta I_{c-}|}{2}$$

$$\Delta Ic_{diff} = \frac{|\delta I_{c+}| - |\delta I_{c-}|}{2}$$

The vector resulting from the differences presented hereinabove is defined as follows:

$$=\Delta I_{diff} = \Delta Ia_{diff} + \Delta Ib_{diff} e^{j2\pi/3} + \Delta Ic_{diff} e^{j4\pi/3}$$

The difference vector $\Delta I_{diff}$ is oriented in a direction in which the magnetic saturation is most pronounced, that is to say, along the axis d on which the rotor is positioned. Consequently, the position of the rotor defined by the angle $\theta_r$ can be deduced directly from the vector $\Delta I_{diff}$, such that:

$$\theta_r = \arctan(\Delta I_{diff})$$

However, the objective of the invention is not to determine the position of the rotor but the flux Ld and torque Lq inductances. For this, the inventive method uses the averages $\Delta Ia_{ave}$, $\Delta Ib_{ave}$, $\Delta Ic_{ave}$ calculated for each phase in both directions. Starting from the averages of the currents obtained for each phase in the two directions, this makes it possible to average the saturation effect which is different depending on whether the current is oriented in a negative direction of in a positive direction.

Moreover, it is known that the currents determined for each phase include a constant component and a variable component dependent on the cosine of twice the angle $\theta_r$ defined hereinabove. The constant component has the value:

$$\Delta I_{ave} = \frac{1}{3}(\Delta Ia_{ave} + \Delta Ib_{ave} + \Delta Ic_{ave})$$

According to the high-frequency standard model of a synchronous machine, the amplitude of the variable component $\Delta I_{var}$ can be determined after demodulation of the averages.

$$\Delta I_{var} = \frac{2}{3}(\Delta Ia_{ave}\cos(2\theta r) + \Delta Ib_{ave}\cos(2\theta r + 2\pi/3) + \Delta Ic_{ave}\cos(2\theta r + 4\pi/3))$$

Based on the constant component $\Delta I_{ave}$ and on the variable component $\Delta I_{var}$, it is possible to determine the maximum and minimum current values which should be obtained when the voltage vectors are applied along the flux axis d and torque axis q of the rotor. There are then obtained:

$$\Delta I_d = \Delta I_{ave} + \Delta I_{var}$$

$$\Delta I_q = \Delta I_{ave} - \Delta I_{var}$$

The inductances Ld, Lq are then deduced from the following relations:

$$L_d = \frac{2/3 V_{dc} \Delta t}{\Delta I_d}$$

$$L_q = \frac{2/3 V_{dc} \Delta t}{\Delta I_q}$$

With Vdc being the voltage of the DC bus and $\Delta t$ being the time measured between two current measurements on the positive peak or on the negative peak.

The invention claimed is:

1. A control method implemented in a variable speed drive for determining flux and torque inductances of a permanent magnet synchronous machine comprising three phases, each oriented in a direction, a stator and a rotor, said method comprising:
    applying, for a predetermined duration in the direction of each phase, a voltage vector in a positive direction, and a voltage vector in a negative direction;
    measuring a current response in each phase after applying the voltage vectors in the two directions, the current response comprising, for each phase, a positive peak and a negative peak;
    determining an angle for the position of the rotor in relation to the stator based on the asymmetries between the positive peaks and the negative peaks of the current responses measured in the phases; and
    determining the flux and torque inductances of the machine as a function of the determined angle, wherein
    for each phase, the voltage vector applied in the positive direction and the voltage vector applied in the negative direction have one and the same norm.

2. The method as claimed in claim 1, wherein, for a phase, applying the voltage vector in the positive direction and of the voltage vector in the negative direction entails applying a voltage sequence comprising a positive voltage pulse of a predetermined pulse width, followed by a negative voltage pulse having two times the predetermined pulse width, followed by a positive voltage pulse of the predetermined pulse width.

3. The method as claimed in claim 2, wherein measuring the current response comprises measuring a positive current peak and a negative current peak, and recovering, for each phase and at the same instants, two distinct current values on the positive current peak in its upward phase and two distinct current values on the negative current peak in its downward phase.

4. The method as claimed in claim 3, further comprising determining the following values:

$$\Delta Ia_{ave} = \frac{|\delta I_{a+}| + |\delta I_{a-}|}{2}$$

$$\Delta Ia_{diff} = \frac{|\delta I_{a+}| - |\delta I_{a-}|}{2}$$

$$\Delta Ib_{ave} = \frac{|\delta I_{b+}| + |\delta I_{b-}|}{2}$$

$$\Delta Ib_{diff} = \frac{|\delta I_{b+}| - |\delta I_{b-}|}{2}$$

$$\Delta Ic_{ave} = \frac{|\delta I_{c+}| + |\delta I_{c-}|}{2}$$

$$\Delta Ic_{diff} = \frac{|\delta I_{c+}| - |\delta I_{c-}|}{2}$$

in which $\delta I_{a+}$, $\delta I_{a-}$, $\delta I_{b+}$, $\delta I_{b-}$, $\delta I_{c+}$, $\delta I_{c-}$ represent, for each phase, the current variations calculated on the basis of the current values recovered on the positive current peak and on the negative current peak that are obtained.

5. The method as claimed in claim 4, wherein the angle is determined on the basis of the following relations:

$$\Delta I_{diff} = \Delta Ia_{diff} + \Delta Ib_{diff} e^{j2\pi/3} + \Delta Ic_{diff} e^{j4\pi/3} \; et \; \theta_r = \arctan(\Delta I_{diff}).$$

6. The method as claimed in claim 5, wherein the flux and torque inductances of the machine are determined on the basis of the following relations:

$$\Delta I_{ave} = \frac{1}{3}(\Delta Ia_{ave} + \Delta Ib_{ave} + \Delta Ic_{ave})$$

$$\Delta I_{var} = \frac{2}{3}(\Delta Ia_{ave}\cos(2\theta r) + \Delta Ib_{ave}\cos(2\theta r + 2\pi/3) + \Delta Ic_{ave}\cos(2\theta r + 4\pi/3)$$

$$\Delta I_d = \Delta I_{ave} + \Delta I_{var}$$

$$\Delta I_q = \Delta I_{ave} - \Delta I_{var}$$

$$L_d = \frac{2/3 V_{dc} \Delta t}{\Delta I_d}$$

$$L_q = \frac{2/3 V_{dc} \Delta t}{\Delta I_q}.$$

7. A variable speed drive comprising a PWM-type inverter for supplying a pulsed voltage to a permanent magnet three-phase synchronous machine, said drive being configured to perform the method defined in claim 1.

8. The method as claimed in claim 1, wherein, for a phase, applying the voltage vector in the positive direction and of the voltage vector in the negative direction entails applying a voltage sequence comprising a positive voltage pulse of a first pulse width, followed by a negative voltage pulse of a second pulse width that is greater than the first pulse width, followed by a positive voltage pulse of the first pulse width.

* * * * *